United States Patent
Karacali-Akyamac et al.

(10) Patent No.: US 8,266,165 B2
(45) Date of Patent: Sep. 11, 2012

(54) ADAPTIVE PARAMETERIZED SEARCH ALGORITHM

(75) Inventors: Bengi Karacali-Akyamac, Bridgewater, NJ (US); Mark John Karol, Fair Haven, NJ (US); Parameshwaran Krishnan, Basking Ridge, NJ (US)

(73) Assignee: Avaya Inc., Basking Ridge, NJ (US)

( * ) Notice: Subject to any disclaimer, the term of this patent is extended or adjusted under 35 U.S.C. 154(b) by 765 days.

(21) Appl. No.: 12/344,244

(22) Filed: Dec. 25, 2008

(65) Prior Publication Data

US 2010/0169374 A1 Jul. 1, 2010

(51) Int. Cl.
*G06F 7/00* (2006.01)
*G06F 17/30* (2006.01)

(52) U.S. Cl. ....................................................... 707/756
(58) Field of Classification Search .................. 707/756
See application file for complete search history.

(56) References Cited

U.S. PATENT DOCUMENTS

| 4,774,657 | A | * | 9/1988 | Anderson et al. | 1/1 |
| 5,113,340 | A | * | 5/1992 | McWherter | 715/236 |
| 6,704,692 | B1 | * | 3/2004 | Banerjee et al. | 702/189 |
| 6,807,546 | B2 | * | 10/2004 | Young-Lai | 1/1 |
| 2005/0187905 | A1 | * | 8/2005 | Dixon et al. | 707/3 |
| 2009/0037879 | A1 | * | 2/2009 | Iyengar et al. | 717/121 |

* cited by examiner

*Primary Examiner* — Robert Beausoliel, Jr.
*Assistant Examiner* — Nicholas Allen

(57) ABSTRACT

A method is disclosed for conducting a search in which measurements of a time-varying property are made and updated during the search, and in which the measurements might be uncertain. In accordance with the illustrative embodiment, one or more search algorithm parameters (e.g., the maximum branching factor of a search tree, a depth cutoff for a search tree, a time cutoff, a threshold, etc.) are adjusted dynamically during the search based on at least one of: the degree of uncertainty of the measurements, the variability of measurements over time (e.g., standard deviation, etc.), and the fraction of members whose measurement is better than a threshold. In addition, the illustrative embodiment enables the search space to be pruned based on these criteria.

20 Claims, 2 Drawing Sheets

ADAPTIVE PARAMETERIZED SEARCH ALGORITHM

FIELD OF THE INVENTION

The present invention relates to data processing in general, and, more particularly, to search algorithms.

BACKGROUND OF THE INVENTION

Many problems in data processing and telecommunications can be solved by intelligently searching through many possible solutions. When the universe of possible solutions, known as the search space, is small, then it is possible to simply perform an exhaustive search—i.e., search the entire search space and find the best solution. In many real-world problems, however, the search space is very large, and therefore finding the best solution via exhaustive search is at best intractable, and at worst impossible. For such problems, it might be necessary to settle for a solution that is "good", rather than optimal.

A variety of search algorithms have been devised to find good, if not necessarily optimal, solutions to search problems. Many of these search algorithms, though not all, are based on data structures known as search trees. In a search tree algorithm, nodes that correspond to possible solutions are expanded to a set of one or more children (or successor) nodes, and the nodes of the tree are explored in accordance with a particular strategy (e.g., breadth-first search, depth-first search with backtracking, heuristic-guided search, etc.).

SUMMARY OF THE INVENTION

The present invention provides a novel method of conducting a search in which measurements of a time-varying property are made and updated during the search, and in which the measurements might be uncertain. In particular, the illustrative embodiment pertains to the problem of selecting a member of a search space that has a good, or ideally the best, measurement of the time-varying property. Such search problems are particularly difficult for conventional search algorithms due to the dynamic nature and uncertainty of information.

The present invention is especially well-suited to the problem of selecting a resource based on a property that varies over time (e.g., quality of service, processor capacity, network connectivity, queue length, etc.), and whose measurement might be uncertain. This problem arises in a wide variety of applications, including peer selection in peer-to-peer systems, server/gateway selection in Internet Protocol (IP) telephony, and overlay routing in Internet Protocol (IP) networks.

In accordance with the illustrative embodiment of the present invention, one or more search algorithm parameters (e.g., the maximum branching factor of a search tree, a depth cutoff for a search tree, a time cutoff, a threshold, etc.) are adjusted dynamically during the search based on: the degree of uncertainty of the measurements, the variability of measurements over time (e.g., standard deviation, etc.), and the fraction of members whose measurement is better than a threshold $\tau$. In addition, the illustrative embodiment enables the search space to be pruned based on these criteria.

The illustrative embodiment comprises: performing a search in accordance with a search algorithm, wherein the search is for finding a member of a search space that has a good, or ideally the best, measurement of a time-varying property, and wherein measurements of the time-varying property are subject to uncertainty; and setting the value of a parameter of the search algorithm based on the degree of uncertainty of the measurements.

DETAILED DESCRIPTION

Figure 1:
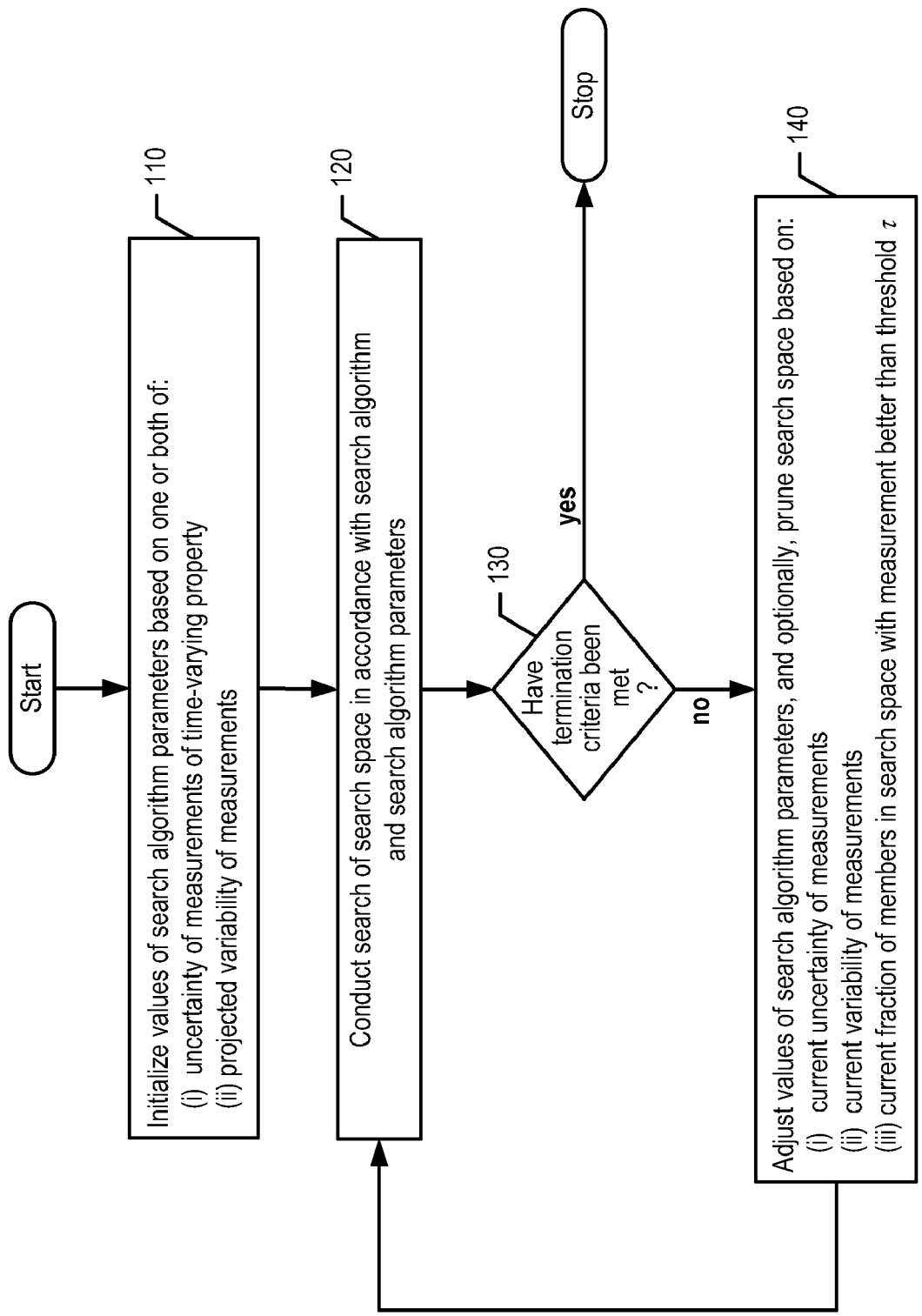
FIG. 1 depicts a flowchart of a method of performing a search of a search space, in accordance with the illustrative embodiment of the present invention.

FIG. 1 depicts a flowchart of a method of performing a search of a search space, in accordance with the illustrative embodiment of the present invention. In particular, the method of FIG. 1 pertains to the use of any search algorithm that has one or more search parameters, and that is for finding a member of the search space that has a good, or ideally the best, measurement of a time-varying property. It will be clear to those skilled in the art, after reading this disclosure, which tasks depicted in FIG. 1 can be performed simultaneously or in a different order than that depicted.

At task 110, the values of the search algorithm parameters are initialized based on one or both of (i) the degree of uncertainty of measurements of the time-varying property, and (ii) the projected variability of the measurements. As will be appreciated by those skilled in the art, in some embodiments of the present invention, measurement uncertainty might be expressed as a confidence interval (e.g., plus or minus 10 percent, etc.), while in some other embodiments, measurement uncertainty might be expressed in some other fashion, while in yet some other embodiments, quantitative information regarding measurement uncertainty might simply not be available, in which case it might not be possible to estimate the degree of uncertainty. As will further be appreciated by those skilled in the art, in some embodiments of the present invention, measurement variability might be expressed as standard deviation, while in some other embodiments measurement variability might be expressed in some other fashion.

As will be appreciated by those skilled in the art, there are a variety of ways in which the search algorithm parameters might be initialized at task 110 based on measurement uncertainty and projected measurement variability. For example, when there is greater measurement uncertainty and/or greater projected measurement variability, the search algorithm parameters might be initialized so that the search examines a greater portion of the search space before terminating (e.g., by setting a higher time cutoff, by setting a higher branch factor, etc.).

At task 120, the search space is searched in accordance with the search algorithm and search algorithm parameters, in well-known fashion. As will be appreciated by those skilled in the art, because of the time-varying nature of the measured property and the uncertainty of measurements, members of the search space might be accordingly re-visited and their measurements updated.

Task 130 checks whether the termination criteria of the search have been met (e.g., whether a time cutoff has been reached, whether a sufficiently good member of the search space has been identified after at least N seconds of search, etc.). If the termination criteria have been met, the method of FIG. 1 terminates, otherwise, execution proceeds to task 140.

At task 140, one or more search algorithm parameters are adjusted based on (i) the current degree of uncertainty of measurements of the time-varying property, (ii) the current variability of the measurements, and (iii) the current fraction of members (e.g., a fraction f) in the search space with a measurement better than a particular threshold τ. As will be appreciated by those skilled in the art, there are a variety of ways in which search algorithm parameters might be adjusted at task 140 based on measurement uncertainty and variability, as described above and with respect to task 110. Additionally, task 140 considers the current fraction of members (e.g., a fraction f) in the search space with a measurement better than a threshold τ. For example, when the fraction is relatively small (e.g., when only 10 percent of visited members have a measurement better than τ, etc.), the search algorithm parameters might be adjusted so that the search examines a greater portion of the search space before terminating (e.g., by setting a higher time cutoff, by setting a higher branch factor, etc.). Conversely, when the fraction is relatively large, the search algorithm parameters might be adjusted so that a smaller portion of the search space is examined before terminating— the theory being that many good candidates have already been found.

In accordance with the illustrative embodiment, the search space might also optionally be pruned based on one or more of criteria (i) through (iii). As will be appreciated by those skilled in the art, such pruning might occur as a by-product of adjusting a search algorithm parameter (e.g., by decreasing a depth cutoff, by decreasing a branching factor, etc.), or might be done explicitly by directly removing one or more members from the search space. After task 140, execution continues back at task 120.

Figure 2:
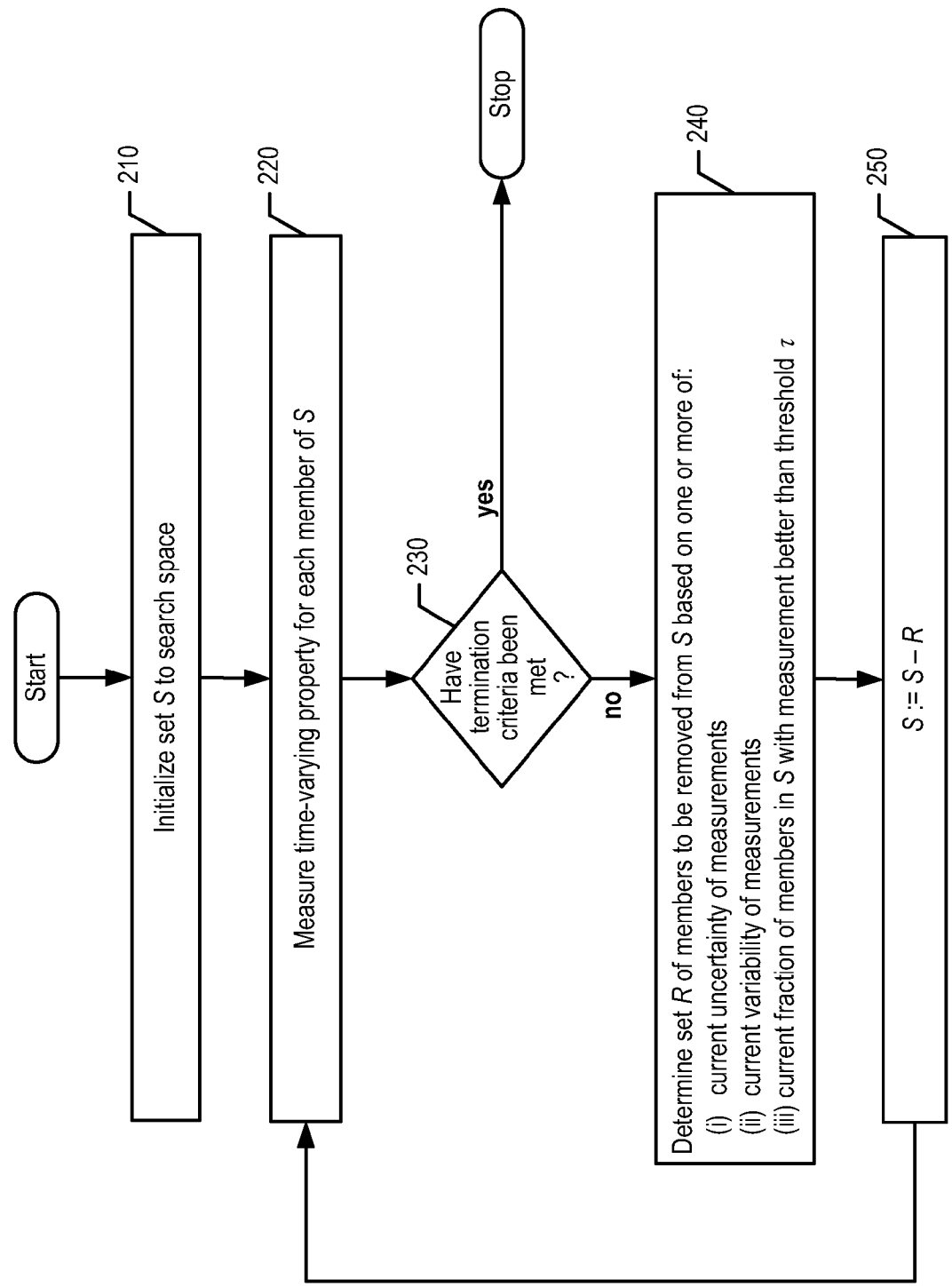
FIG. 2 depicts a flowchart of a method of performing a search of a relatively small search space, in accordance with the illustrative embodiment of the present invention.

FIG. 2 depicts a flowchart of a method of performing a search of a relatively small search space, in accordance with the illustrative embodiment of the present invention. As will be appreciated by those skilled in the art, when the search space is sufficiently small, then it is possible to evaluate all of the members of the search space. However, due to the time-varying nature of the measured property, as well as the uncertainty of measurements, the search problem is more complex than simply measuring the time-varying property for each member once and selecting the best one.

At task 210, set S is initialized to the search space.

At task 220, the time-varying property is measured for each member of set S.

Task 230 checks whether the termination criteria have been met (e.g., whether a time cutoff has been reached, whether a sufficiently good member of the search space has been identified, etc.). If the termination criteria have been met, the method of FIG. 2 terminates, otherwise, execution proceeds to task 240.

At task 240, a set R ⊂ S of members to be removed from set S is determined based on one or more of (i) the current degree of uncertainty of measurements of the time-varying property (ii) the current variability of the measurements, and (iii) the current fraction of members of set S with a measurement better than a particular threshold τ. As will be appreciated by those skilled in the art, there are a variety of ways in which set R might be determined based on criteria (i) through (iii). For example, when there is greater measurement uncertainty and/ or greater projected measurement variability, the size of set R might be set smaller—the theory being that fewer weak candidates should be discarded in such instances. Conversely, when the fraction of members of set S having a measurement better than a particular threshold τ is relatively large, the size of set R might be set larger—the theory being that set S is rich in good candidates.

As will further be appreciated by those skilled in the art, the particular members that are selected for inclusion in set R might be determined in a variety of ways. For example, in some embodiments, members with the weakest current value of the time-varying property might be selected for inclusion in set R, while in some other embodiments, members with the weakest moving average of the time-varying property might be selected for inclusion in set R, while in still yet other embodiments, members with the largest variability of measurements might be selected for inclusion in set R.

At task 250, set S is set to S−R (i.e., the members of R are removed from set S). After task 250, execution continues back at task 220.

As will be appreciated by those skilled in the art, the method of FIG. 2 might be considered a particular case of the method of FIG. 1, where the size of set R is a search algorithm parameter.

As will be further appreciated by those skilled in the art, the method of FIG. 2, like the method of FIG. 1, represents a "family" of possible search algorithms. Empirical observations of the efficacy and performance of this family of search algorithms under various network conditions indicate that: (i) when there are many good candidates, rapid selection (i.e., a large set R) results in a short search time, and (ii) when there are few good candidates, candidates should be probed longer (i.e., a small set R)—depending on the accuracy of the measurements—before they are eliminated from the search. When the variability in the measurements is low, then few probes are sufficient to assess path quality. In such situations, search algorithms that aggressively cut the number of candidates to be probed in the next step (large R) perform well. When the variability in the measurements is high, a moderate level of probing (small R) is necessary.

A particular implementation of the method of FIG. 2 that was developed based on these observations is now described. In this implementation, the search algorithm learns the network conditions and adapts its parameters for efficient search. At each step, the search algorithm estimates the fraction of good candidates in the network as well as the variability in the measurements. At the end of the probing period at each step, all the probes sent to the candidates (including those sent in previous steps) are used to estimate the fraction of good candidates in the system. We refer to this estimate as $\alpha'$. Additionally, for each candidate, we compute the ratio of the standard deviation in the candidate's measurements (since the first step) to the mean of the measurements. If this figure is greater than a parameter (e.g., 0.5, etc.), we consider the candidate's measurements to be unstable. We refer to the fraction of unstable candidates in the system as $\gamma'$.

In accordance with the search algorithm, the value of $|R|/|S|$ is dynamically selected at each step based on $\alpha'$ and $\gamma'$. In particular, when $\alpha'$ is greater than a threshold value $\alpha'_T$, it is assumed that there are many good candidates in the system. Similarly, when $\gamma'$ is greater than a threshold value $\gamma'_T$, it is assumed that there are many candidates with high measurement variability.

In accordance with the search algorithm, when $\alpha' \geq \alpha'_T$ and $\gamma' \geq \gamma'_T$, which means that there are many good targets and high uncertainty, a candidate is selected immediately (in other words, R=S or, equivalently, $|R|/|S|=1$). When $\alpha' \geq \alpha'_T$ and $\gamma' < \gamma'_T$, which means that there are many good targets and low uncertainty, a candidate is also selected immediately. When $\alpha' < \alpha'_T$ and $\gamma' < \gamma'_T$, which means that there are few good targets and low uncertainty, $|R|$ is set to $\sqrt{|S|}$, which translates to probing for a moderately long period of time. Finally, when $\alpha' < \alpha'_T$ and $\gamma' > \gamma'_T$, which means that there are few good targets and high uncertainty, |R| is set to $\sqrt[4]{|S|}$, which translates to probing for a longer period of time.

As will be appreciated by those skilled in the art, although the illustrative embodiment is disclosed in the context of a single time-varying property, it will be clear to those skilled in the art, after reading this disclosure, how to apply the methods of the illustrative embodiment to problems concerning a plurality of time-varying properties, or to time-varying properties such as quality of service (QoS) that might be derived from a plurality of measurements (e.g., jitter, delay, packet loss, etc.).

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method comprising:
    searching, via a search algorithm, a search space for a member of the search space that has a measurement of a time-varying property, the measurement comprising a confidence interval having a degree of measurement uncertainty; and
    setting, via a processor, a value of a parameter of the search algorithm based on the degree of measurement uncertainty, wherein the parameter comprises a depth cutoff for a search tree.

2. The method of claim 1, further comprising changing the value of the parameter in response to a change in the degree of measurement uncertainty.

3. The method of claim 1, further comprising pruning the search space based on the degree of measurement uncertainty.

4. The method of claim 1, wherein the parameter affects a search duration.

5. The method of claim 1, wherein setting the value of the parameter is also based on a variability of measurements for members of the search space.

6. The method of claim 1, wherein setting the value of the parameter is also based on a fraction of a plurality of members of the search space having measurements above a threshold.

7. The method of claim 1, wherein the measurement is based on a calculation of at least one of a jitter, a delay, and a packet loss.

8. A system comprising:
    a processor; and
    a computer-readable medium having stored therein instructions which, when executed by the processor, cause the processor to perform a method comprising:
        searching, via a search algorithm, a search space for a member of the search space that has a measurement of a time-varying property, the measurement comprising a confidence interval having a degree of measurement uncertainty; and
        setting a value of a parameter of the search algorithm based on the degree of measurement uncertainty, wherein the parameter comprises a depth cutoff for a search tree.

9. The system of claim 8, wherein setting the value of the parameter is also based on a variability of measurements for members of the search space, wherein the variability of measurements is expressed as standard deviation.

10. The system of claim 9 the computer-readable medium storing instructions which, when executed by the processor, cause the processor to perform a method further comprising changing the value of the parameter in response to a change in the variability of measurements.

11. The system of claim 9, the computer-readable medium storing instructions which, when executed by the processor, cause the processor to perform a method further comprising pruning the search space based on the variability of measurements for members of the search space.

12. The system of claim 8, wherein the parameter is a maximum branching factor of a search tree.

13. The system of claim 8, wherein the parameter affects a search duration.

14. The system of claim 8, wherein setting the value of the parameter is also based on a fraction of a plurality of members of the search space having a respective measurements above a threshold.

15. A non-transitory computer-readable medium having stored therein instructions which, when executed by a processor, cause the processor to perform a method comprising:
    searching, via a search algorithm, a search space for a member of the search space that has a measurement of a time-varying property, the measurement comprising a confidence interval having a degree of measurement uncertainty; and
    setting a value of a parameter of the search algorithm based on the degree of measurement uncertainty, wherein the parameter comprises a depth cutoff for a search tree.

16. The non-transitory computer-readable medium of claim 15, the instructions which, when executed by the processor, cause the processor to perform a method further comprising changing the value of the parameter during the search in response to a change in a fraction of a plurality of members of the search space that has respective measurements of the time-varying property that are above a threshold.

17. The non-transitory computer-readable medium of claim 16 the instructions which, when executed by the processor, cause the processor to perform a method further comprising pruning the search space based on the fraction.

18. The non-transitory computer-readable medium of claim 16, wherein the parameter affects a duration of the search.

19. The non-transitory computer-readable medium of claim 16, wherein the plurality of members of the search space comprises members that are visited by searching.

20. The non-transitory computer-readable medium of claim 16, wherein the plurality of members of the search space comprises all of the members of the search space.

* * * * *